United States Patent
Schuler

(10) Patent No.: US 6,499,377 B1
(45) Date of Patent: Dec. 31, 2002

(54) VEHICLE STEERING WHEEL

(75) Inventor: Patrik Schuler, Obernburg (DE)

(73) Assignee: TRW Automotive Safety Systems GmbH & Co. KG, Aschaffenburg (DE)

(*) Notice: Subject to any disclaimer, the term of this patent is extended or adjusted under 35 U.S.C. 154(b) by 0 days.

(21) Appl. No.: 09/598,138

(22) Filed: Jun. 21, 2000

(30) Foreign Application Priority Data

Jun. 23, 1999 (DE) .......................... 299 10 997

(51) Int. Cl.$^7$ ................ B62D 1/11; G05G 1/10
(52) U.S. Cl. ...................................... 74/558
(58) Field of Search ............ 74/552, 558, 558.5, 74/473.29, 490; 29/894.1

(56) References Cited

U.S. PATENT DOCUMENTS 3,802,291 A * 4/1974 Young et al. ............ 74/552
4,581,954 A * 4/1986 Uchida ..................... 74/558

FOREIGN PATENT DOCUMENTS

| DE | 29702241 | 5/1997 |
| DE | 29803133 | 5/1998 |
| GB | 2058694 | 4/1981 |
| WO | 9833693 | 8/1998 |

* cited by examiner

Primary Examiner—Chong H. Kim
(74) Attorney, Agent, or Firm—Tarolli, Sundheim, Covell, Tummino & Szabo L.L.P.

(57) ABSTRACT

The invention relates to a vehicle steering wheel, comprising a steering wheel skeleton encased in foam and consisting of a steering wheel rim, a hub and at least one spoke connecting the hub with the steering wheel rim. The steering wheel further comprises a panel which is visible from outside on the steering wheel rim. A clip is provided which is constructed as a separate part and engages on the steering wheel rim. the panel is fastened to the steering wheel rim by means of the at least one clip and the panel together with the clip completely surround the steering wheel rim.

15 Claims, 2 Drawing Sheets

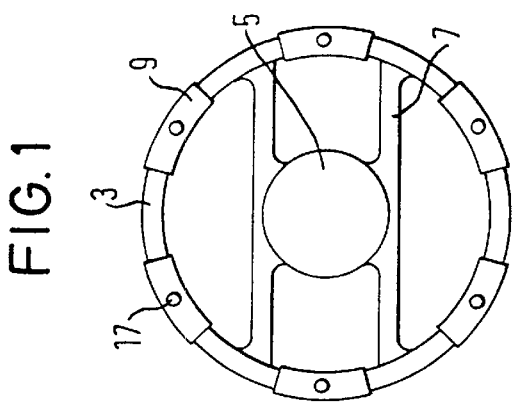
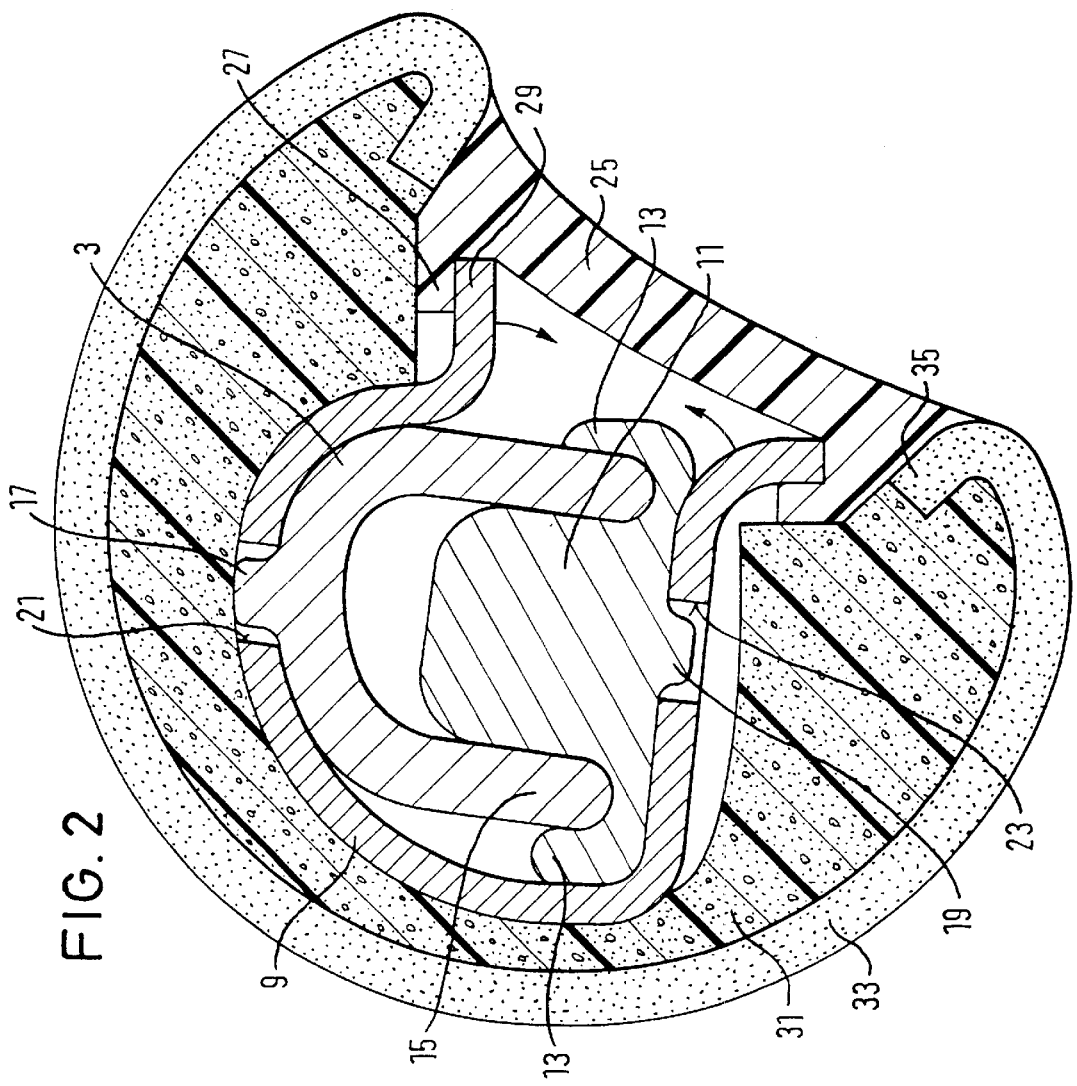

VEHICLE STEERING WHEEL

TECHNICAL FIELD

The invention relates to a vehicle steering wheel.

BACKGROUND OF THE INVENTION

Steering wheels having an expensive appearance increasingly have a panel or cover of hard material, visible from outside, on the steering wheel rim, preferably on the inner face of the steering wheel rim facing the hub. Such panels generally have on their outer face an imitation of wood, which is intended to give the steering wheel a higher-quality appearance. The fastening of such panels to the steering wheel is complicated and expensive. The embedding of the panel into the foam casing of the steering wheel rim or the direct attachment on the steering wheel skeleton, more precisely on the steering wheel rim of the steering wheel skeleton, are provided as fastening possibilities.

BRIEF SUMMARY OF THE INVENTION

The invention provides a vehicle steering wheel in which the fastening of the panel can take place quickly, simply and at a favorable cost. This is achieved in a vehicle steering wheel which comprises a steering wheel skeleton encased in foam and consisting of a steering wheel rim, a hub and at least one spoke connecting the hub with the steering wheel rim. The steering wheel further comprises a panel which is visible from outside on the steering wheel rim. A clip is provided which is constructed as a separate part and engages on the steering wheel rim. The panel is fastened to the steering wheel rim by means of the at least one clip, and the panel together with the clip completely surround the steering wheel rim. The panel and the clip form a unit which fully embraces the steering wheel rim in the circumferential direction, seen in a cross-sectional view through the rim. In steering wheels known hitherto, the steering wheel skeletons had to be coordinated with the fastening of the panel, which made the skeleton more complicated in its construction. In the steering wheel according to the invention, on the other hand, the clip is a separate part which is only fastened to the steering wheel skeleton when required and in addition can be positioned at various points. Through the use of the clip, a greater flexibility is achieved in the production of different steering wheels with and without a panel, or with various panels. In addition, it is possible through the flexible clip to hold the clips on the steering wheel skeleton and/or the panel on the clip permanently with pre-stressing, so that a loosening of the parts from each other or a vibrating after several years of driving operation can be avoided which is achieved by the panel and the clip completely surrounding the steering wheel rim.

Preferably, the panel and the clip are connected with each other by means of a clip connection, i.e. a very simple type of fastening which requires little installation time.

The clip can embrace the steering wheel rim and is thereby securely positioned. For example, provision is made for this that the clip, according to a preferred embodiment, has a C-shaped cross-sectional profile. The panel can engage on the outer or inner face on the free edges, lying opposite each other. Through the C-shaped profile with the free edges, the clip achieves a sufficiently high flexibility in order to realize the desired clip connection Hook-shaped extensions on the panel engage behind the free edges, in accordance with the preferred embodiment, to provide a secure connection.

According to another development of the invention, the panel presses the free edges towards each other so that it endeavors to close the clip which is open in cross-section. The clip and panel thereby reciprocally secure each other on the steering wheel skeleton.

The clip is of course also encased in foam, the panel, the clip and the foam casing being coordinated with each other such that with the steering wheel encased in foam, the panel can be clipped onto the clip from outside. Preferably, this clipping on should still be possible even after a covering of the steering wheel with leather, if a covering with leather takes place at all, in order to avoid the panel having to be integrated into the process of encasing in foam.

The clip can in addition have a dual function by on the one hand arresting the panel and on the other hand arresting an additional mass on the steering wheel rim. Separate additional masses, fastened at desired sites on the steering wheel rim, are intended to increase the inert mass of the vehicle steering wheel as a whole and to largely prevent vibrations.

Between the clip and the steering wheel rim, a form-fitting connection can also be provided, so that the positions of the parts to each other are fixed. This prevents faulty installations.

BRIEF DESCRIPTION OF THE DRAWINGS

FIG. 1 shows a top view onto a diagrammatically illustrated steering wheel skeleton according to the invention, with several clips, FIG. 2 shows a cross-section through a steering wheel rim, encased in foam and covered with leather, of a steering wheel according to the invention, in accordance with a first embodiment.

DETAILED DESCRIPTION OF THE PREFERRED EMBODIMENTS

Figure 3:
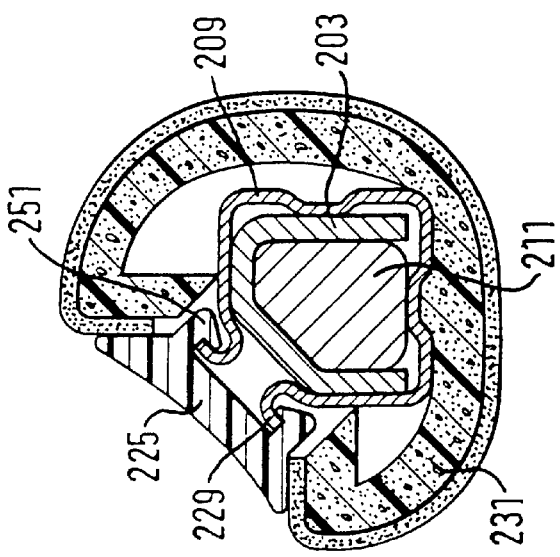
FIG. 3 shows a cross-section through a steering wheel rim, encased in foam and covered with leather, of the steering wheel according to the invention, in accordance with a second embodiment.

In FIG. 1 a steering wheel skeleton is illustrated, consisting of a steering wheel rim 3, a steering wheel hub 5 and several spokes 7 connecting the steering wheel rim 3 with the steering wheel hub 5. Several additional masses are arranged on the periphery of the steering wheel rim 3, uniformly distributed, to increase the inertia of the steering wheel and hence to reduce the vibrations in driving operation. The additional masses can be seen in the following figures; in FIG. 1 only clips 9 are visible, which serve inter alia for arresting the additional masses on the steering wheel rim 3.

In FIG. 2, which is a greatly enlarged view through a steering wheel in the region of the steering wheel rim, the steering wheel rim 3 of the skeleton is illustrated as an open hollow profile. The hollow profile is open to the rear face of the steering wheel (at the bottom in the drawings). From this side, an additional mass 11 is inserted into the hollow profile. The additional mass is adapted in its shape to the inner face of the hollow profile, so that no transverse movements can occur between the steering wheel rim 3 and the additional mass 11. The additional mass of forged steel is accommodated almost completely inside the steering wheel rim 3.

Only two lateral extensions 13 surround the free edges 15 of the steering wheel rim 3 and serve for the additional fixing of the additional mass 11 on the steering wheel rim 3. The arresting of the additional mass 11 on the steering wheel rim 3 takes place by a clip 9 bent in a C-shape, which can be clipped from outside onto the steering wheel rim 3 which is not yet encased in foam and not yet covered with leather. The clip is formed from a wide spring steel band and presses the additional mass 11 under prestressing into the interior of the steering wheel rim 3. So that the steering wheel rim 3 is positioned exactly to the clip 9 and the latter is exactly positioned to the additional mass 11, and so that the sites on the periphery of the steering wheel rim 3 on which the additional mass 11 is to be fastened are preset, form-fitting connections are provided between steering wheel rim 3 and clip 9 and also between clip 9 and additional mass 11. The form-fitting connections are each formed by at least one projection 17 on the front face of the steering wheel rim 3 and one projection 19 on the additional mass 11 and also by recesses 21 and 23 in the clip 9, into which the projections 17 and 19, respectively, project. The projections 17 can also be seen in FIG. 1.

The illustrated steering wheel which has a high-quality appearance, has externally visible panels 25 of plastic, composite material, aluminum, wood or of another suitable material, which panels have for example on the exterior an imitation of wood. A panel 25 of plastic, arranged on the inner face of the steering wheel rim, is shown in FIG. 2. On the periphery of the steering wheel rim, on the inner face, a panel 25 sits in the region of each clip 9, which panel 25 covers on the inner face a segment of the steering wheel rim, the latter encased in foam. The panel 25 has outer edges 27, which are directed towards each other. These edges 27 each engage an associated, outwardly bent edge 29 of the clip 9. Thereby, a form-fitting clip connection is produced between the free edges 29 of the clip 9 and the edges 27 of the panel 25. The panel 25 endeavors to press the edges 29 together and serves as additional arresting of the clip 9. The clip 9 is pressed in a prestressed manner against the steering wheel rim. The clip 9 in turn serves for arresting the panel 25, because the panel 25 does not require an additional means for its arresting on the steering wheel rim.

As can be seen in addition from FIG. 2, the shape of the clip 9 is largely adapted to the outer contour of the steering wheel rim 3 and also to the additional mass 11, so that an extensive abutment of the clip 9 is produced against the steering wheel rim 3 on the front face and against the additional mass 11 on he rear face. Further, it can be seen from FIG. 2 that the panel together with the clip completely surrounds the steering wheel rim in the circumferential direction in those sections of the rim where both panels and clips are provided.

The steering wheel rim 3 together with the clips and the additional masses 11 arranged thereon is surrounded by a foamed casing 31, adjoining which on the outer face is a leather covering 33. The leather covering 33 has ends 35 towards the panel 25, which ends 35 are deflected into the interior of the foam casing of the steering wheel rim.

The production of the illustrated steering wheel is explained in detail hereinbelow. After the production of the steering wheel skeleton, the additional masses 11 are fastened by means of the clips 9 to the sites marked by the projections 17. Here, firstly, each additional mass 11 is pressed into the hollow interior of the steering wheel rim 3. Then the clip 9 is placed in position, the projections 17, 19 engaging into their recesses 21 and 23, respectively. Then the steering wheel is encased in foam and covered with leather. Finally, the panels 25 are inserted from the inner face of the steering wheel rim, the edges 27, 29 forming a latching connection, for which reason the panels only have to be clipped onto the clips.

The embodiment illustrated in FIG. 3 corresponds substantially to the one previously discussed, with the parts already discussed having the reference numbers already introduced, increased by the number 100. In contrast to the embodiment shown in FIG. 2, the additional mass 111 is accommodated completely inside the hollow interior of the steering wheel rim 103. It can also be pushed completely into this hollow interior. So that the flexible clip 109 lies with a prestressing against the additional mass 111, it has a projection 141, by which it contacts the additional mass 111. A further projection 143 serves to provide a prestressing in a transverse direction. In this embodiment, the clip 109 is provided with edges 129 which are bent towards each other. The panel 125 in turn has hook-shaped extensions 151 which engage behind the free edges 129. With the clip 109 inserted, the edges 129 are pressed away from each other.

Figure 4:
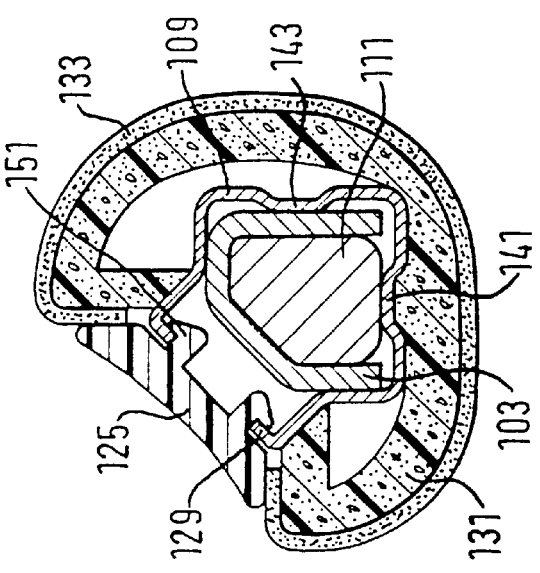
FIG. 4 shows a cross-section through a steering wheel rim, encased in foam and covered with leather, of a steering wheel according to the invention, in accordance with a third embodiment.

The embodiment illustrated in FIG. 4 corresponds substantially to that shown in FIG. 3 and already discussed. Here, also, the reference numbers which have already been used are used again, however again increased by the number 100. In contrast to the embodiment shown in FIG. 3, the clip 209, which is surrounded by foam 231, embraces the steering wheel rim 203 still more, so that it engages more securely on the steering wheel rim 203, with the additional mass 211, of the skeleton. In this embodiment, the clip has edges 229 which are bent outwards more intensively and which engage behind the hook shaped extensions 251 of the panel 225 and press them towards each other.

What is claimed is:

1. A vehicle steering wheel comprising:
    a hub,
    a rim,
    at least one spoke,
    a steering wheel skeleton encased in foam, the steering wheel skeleton consisting of a rim skeleton, a hub skeleton and at least one spoke skeleton connecting the hub skeleton with the rim skeleton,
    a cover for at least partially covering the foam,
    a panel visible from the outside on the steering wheel, and
    at least one clip constructed as a separate part arranged between the foam and the rim skeleton and contacting and at least partially encircling the rim skeleton, the panel being fastened to the rim skeleton by the at least one clip,
    the panel together with the clip completely circumferentially surrounding the rim skeleton when viewed in a radial cross section of the rim.

2. The vehicle steering wheel according to claim 1, wherein the panel is connected with the clip by a clip connection.

3. The vehicle steering wheel according to claim 1, wherein the clip has free edges lying opposite each other, the panel engaging the free edges on at least one of an outer and an inner face.

4. The vehicle steering wheel according to claim 3, wherein the panel has hook-shaped extensions which engage behind the free edges.

5. The vehicle steering wheel according to claim 1, wherein the free edges of the clip are spring loaded and bias towards each other when the panel is clipped to the clip.

6. The vehicle steering wheel according to claim 1, wherein the panel presses the free edges together.

7. The vehicle steering wheel according to claim 1, wherein the visible panel, the clip and the foam casing are coordinated with each other such that with the steering wheel encased in foam, the panel is clipped onto the clip.

8. The vehicle steering wheel according to claim 7, wherein the panel is clipped onto the clip when the steering wheel has been encased in foam.

9. The vehicle steering wheel according to claim 8, wherein the panel is clipped onto the clip when the steering wheel has been encased in foam and covered with leather.

10. The vehicle steering wheel according to claim 1, wherein an additional mass is provided which is fastened to the steering wheel rim by means of the clip.

11. The vehicle steering wheel according to claim 1, wherein a form-fitting connection is provided between the clip and the steering wheel rim.

12. A vehicle steering wheel comprising:
   a hub,
   a rim,
   at least one spoke,
   a steering wheel skeleton encased in foam, the steering wheel skeleton consisting of a rim skeleton, a hub skeleton and at least one spoke skeleton connecting the hub skeleton with the rim skeleton,
   a cover for at least partially covering the foam,
   a panel visible from the outside on the steering wheel,
   at least one clip constructed as a separate part and engaging the rim skeleton, the clip, when viewed in a radial cross section through the rim, being shaped as an open ring and having two free edges lying opposite each other,
   the panel being fastened to the rim skeleton by means of the at least one clip, the panel engaging the free edges on at least one of an outer and an inner face, and
   the panel together with the clip completely circumferentially surrounding the rim skeleton, when viewed in a radial cross section through the rim.

13. The vehicle steering wheel according to claim 12, wherein the free edges of the clip are spring loaded and bias towards each other when the panel is clipped to the clip.

14. The vehicle steering wheel according to claim 6, wherein said panel presses said free edges apart.

15. The vehicle steering wheel according to claim 11, wherein said steering wheel rim has a projection and said clip has a recess, said form-fitting connection being formed by means of said projection engaging said recess.

* * * * *